United States Patent [19]
Takahashi

[11] Patent Number: 5,856,039
[45] Date of Patent: Jan. 5, 1999

[54] NON-AQUEOUS ELECTROLYTE SECONDARY CELL

[75] Inventor: Masatoshi Takahashi, Hyogo, Japan

[73] Assignee: Sanyo Electric Company, Ltd., Osaka, Japan

[21] Appl. No.: 824,734

[22] Filed: Mar. 26, 1997

[30] Foreign Application Priority Data

Mar. 27, 1996 [JP] Japan .................................... 8-071985

[51] Int. Cl.⁶ .................................................... H01M 2/14
[52] U.S. Cl. .......................... 429/129; 429/133; 429/249; 429/194; 429/197; 429/192
[58] Field of Search .................................... 429/194, 197, 429/249, 122, 129, 133, 192

[56] References Cited

U.S. PATENT DOCUMENTS

| | | | |
|---|---|---|---|
| 5,352,548 | 10/1994 | Fujimoto et al. | 429/197 |
| 5,643,695 | 7/1997 | Barker et al. | 429/197 |
| 5,686,138 | 11/1997 | Fujimoto et al. | 429/197 |

FOREIGN PATENT DOCUMENTS

| | | |
|---|---|---|
| 63-94556 | 4/1988 | Japan . |
| 63-308866 | 12/1988 | Japan . |
| 5-74436 | 3/1993 | Japan . |
| 5-74442 | 3/1993 | Japan . |
| 6-208849 | 7/1994 | Japan . |

*Primary Examiner*—Bruce F. Bell
*Attorney, Agent, or Firm*—Foley & Lardner

[57] ABSTRACT

A non-aqueous electrolyte secondary cell includes a positive electrode containing lithium-contained complex oxide, a negative electrode containing a material which can absorb and desorb lithium or lithium ion, and a separator which is filled with an organic electrolyte. The separator is composed of a plurality of laminated blend polymer fine porous films each containing polyethylene and polypropylene, and at least one of the laminated blend polymer fine porous films has a different ratio of polyethylene and polypropylene from the other blend polymer fine porous films. In this construction, a blend polymer fine porous film having a higher ratio of polypropylene increases the piercing strength of the separator, and at the same time a blend polymer fine porous film having a higher ratio of polyethylene increases the shut-down characteristic.

8 Claims, 3 Drawing Sheets

NON-AQUEOUS ELECTROLYTE SECONDARY CELL

BACKGROUND OF THE INVENTION

(1) Field of the Invention

The present invention relates to a non-aqueous electrolyte secondary cell which is composed of a positive electrode containing a lithium-contained complex oxide, a negative electrode containing material that can absorb and desorb lithium or lithium ion, and a separator filled with an organic electrolyte.

(2) Description of the Related Art

In spite of the advantage of high-density energy, this type of cells have the following disadvantages: When the cells are externally short-circuited, large short-circuit current runs inside the cells. As a result, Joulean heat is caused, and the cell temperature rises to an extreme level. This might cause the organic electrolyte to react with the electrodes, especially the positive electrode, and to burn. In order to secure the safety of the cells against such an extreme temperature increase, the current supply is shut down by making the separators composed of polyolefin fine porous films melt down, thereby closing their fine pores. However, the films are as thin as 25 to 35 $\mu$m, so that they tend to be damaged by the unevenness of the electrodes, thereby causing the cells to be slightly short-circuited. This leads to the self discharge.

In order to prevent the separator from being damaged by the unevenness of the electrodes, it has been suggested to use polypropylene (hereinafter PP) or polyethylene (hereinafter PE) that has high molecular weight for the separator, thereby enhancing the piercing strength of the separator. However, the separator containing PP or PE that has high molecular weight does not melt down until the cell temperature reaches a high level because the melting point of the separator is also high. This might cause the cell temperature to rise extraordinarily, or the shut-down characteristic of the separator to be deteriorated.

It has also been suggested to use a blend polymer fine porous film which contains both PP and PE for the separator, in order to enhance the piercing strength. However, the mere use of the blend polymer fine porous film containing PP and PE does not achieve an increase in the piercing strength and an increase in the shut-down characteristic at the same time. The reason for this is as follows: When the ratio of PE to PP is low, the fine pores of the film are not completely closed when PE reaches its melting point, whereas when the ratio of PE to PP is high, the piercing strength is low due to the influence of PE.

SUMMARY OF THE INVENTION

In view of these problems, an object of the present invention is to provide a non-aqueous electrolyte secondary cell whose separator has a high piercing strength and high shut-down characteristic.

Another object of the present invention is to provide a non-aqueous electrolyte secondary cell whose separator consists of laminated fine porous films which are hard to come off.

Further another object of the present invention is to provide a non-aqueous electrolyte secondary cell whose separator maintains its form when it melts down.

The objects can be achieved by a rechargeable non-aqueous electrolyte secondary cell comprising a positive electrode containing lithium-contained complex oxide; a negative electrode containing a material which absorbs and desorbs either lithium or lithium ion; and a separator which is filled with an organic electrolyte. The separator is composed of a plurality of laminated polymer fine porous films each containing PE and PP, and at least one of the plurality of laminated blend polymer fine porous films has a different ratio of PE and PP from other blend polymer fine porous films.

The blend polymer fine porous films positioned at both ends of the plurality of laminated blend polymer fine porous films may have a higher ratio of PP than the other blend polymer fine porous films.

The separator may consist of three laminated blend polymer fine porous films, and the blend polymer fine porous film in the middle may have a lower ratio of PP than two other blend polymer fine porous films.

The blend polymer fine porous film in the middle may have 20% or lower of PP, and the two other blend polymer fine porous films may have 60% or higher of PP.

The blend polymer fine porous film in the middle may have 20% or lower of PP, and the two other blend polymer fine porous films may have 80% or higher of PP.

The reason for the successful achievement of the objects is as follows. By laminating blend polymer fine porous films which contain PE and PP in different proportions, a film containing a high percentage of PP enhances the piercing strength and a film containing a high percentage of PE improves the shut-down characteristic of the separator.

Unlike laminating fine porous films which contain either PE or PP, laminating blend polymer fine porous films does not suffer from the coming off of the films. As a result, the working performance and reliability of the cell are improved.

In addition, a blend polymer fine porous film having a high proportion of PP has an excellent heat resistance. By disposing such a film at the end of the film lamination, the form of the separator is maintained even if an inner film having a low proportion of PP melts down.

The separator may be produced by laminating the blend polymer fine porous film in the middle having a lower ratio of PP between the two other blend polymer fine porous films having a higher ratio of PP, and by heating three laminated blend polymer fine porous films at a temperature lower than a melting point of PE.

The separator may be produced by laminating at least one blend polymer fine porous film having a lower ratio of PP and at least one blend polymer fine porous film having a higher ratio of PP, and by heating the laminated blend polymer fine porous films at a temperature lower than a melting point of PE.

The reason for heating the films at a temperature lower than the melting point of PE is as follows: The melting points of PP and PE are 160° C. and 130° C., respectively, so that the melting of PE in the separator can be prevented if the films are heated at a temperature lower than the melting point of PE.

The separator may have a thickness of 20 to 35 $\mu$m.

The reason for determining the range of the thickness of the separator is as follows: When the separator is thinner than 20 $\mu$m, both the piercing strength and the shut-down characteristic deteriorate, whereas when it is thicker than 35 $\mu$m, the distance between the electrodes becomes larger and the internal resistance of the cell increases, and as a result, the cell performance such as high-rate discharge characteristic deteriorates.

The material of the positive electrode may be selected from a group consisting of $LiCoO_2$; $LiNiO_2$, $LiMnO_2$, $LiMn_2O_4$, and $LiFeO_2$.

The solvent of the organic electrolyte may be at least one organic solvent which is selected from a group consisting of ethylene carbonate, vinylene carbonate, and propylene carbonate, or a mixture of the at least one organic solvent and at least one low-boiling-point solvent which is selected from a group consisting of dimethyl carbonate, diethyl carbonate, 1,2-dimethoxyethane, 1,2-diethoxyethane, and ethoxymethoxyethane.

The solute of the electrolyte may be selected from a group consisting of $LiPF_6$; $LiClO_4$, and $LiCF_3SO_3$.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 2:
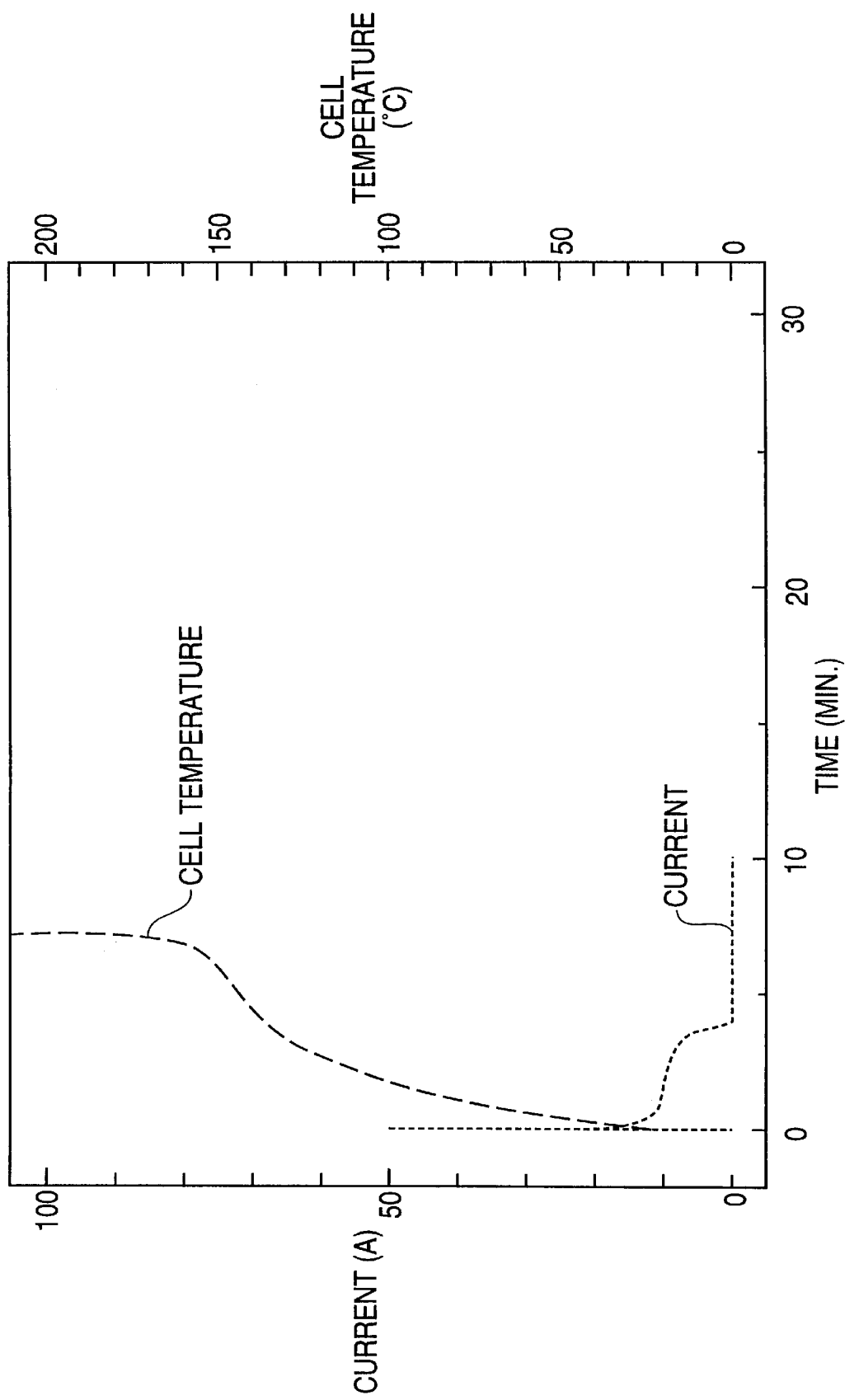
FIG. 2 is a graph showing the relationship between time and current, and also between time and cell temperature when a cell whose separator is composed of blend polymer fine porous films containing 80% of PP is externally short-circuited.
Figure 3:
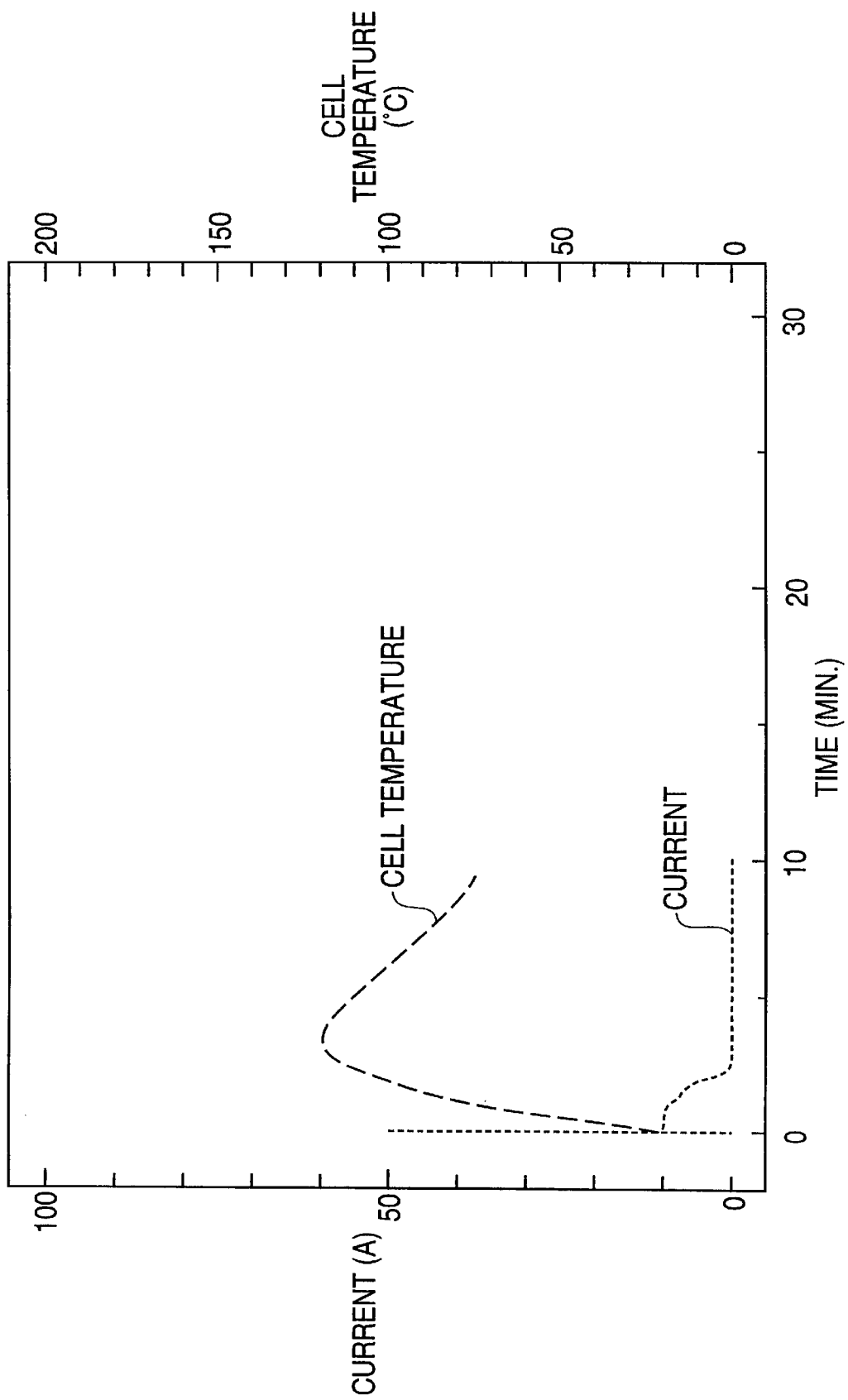
FIG. 3 is a graph showing the relationship between time and current, and also between time and cell temperature when a cell whose separator is composed of blend polymer fine porous films containing 20% of PP is externally short-circuited.

The embodiment of the present invention will be detailed as follows with reference to FIGS. 1–3.

Embodiment 1

Figure 1:
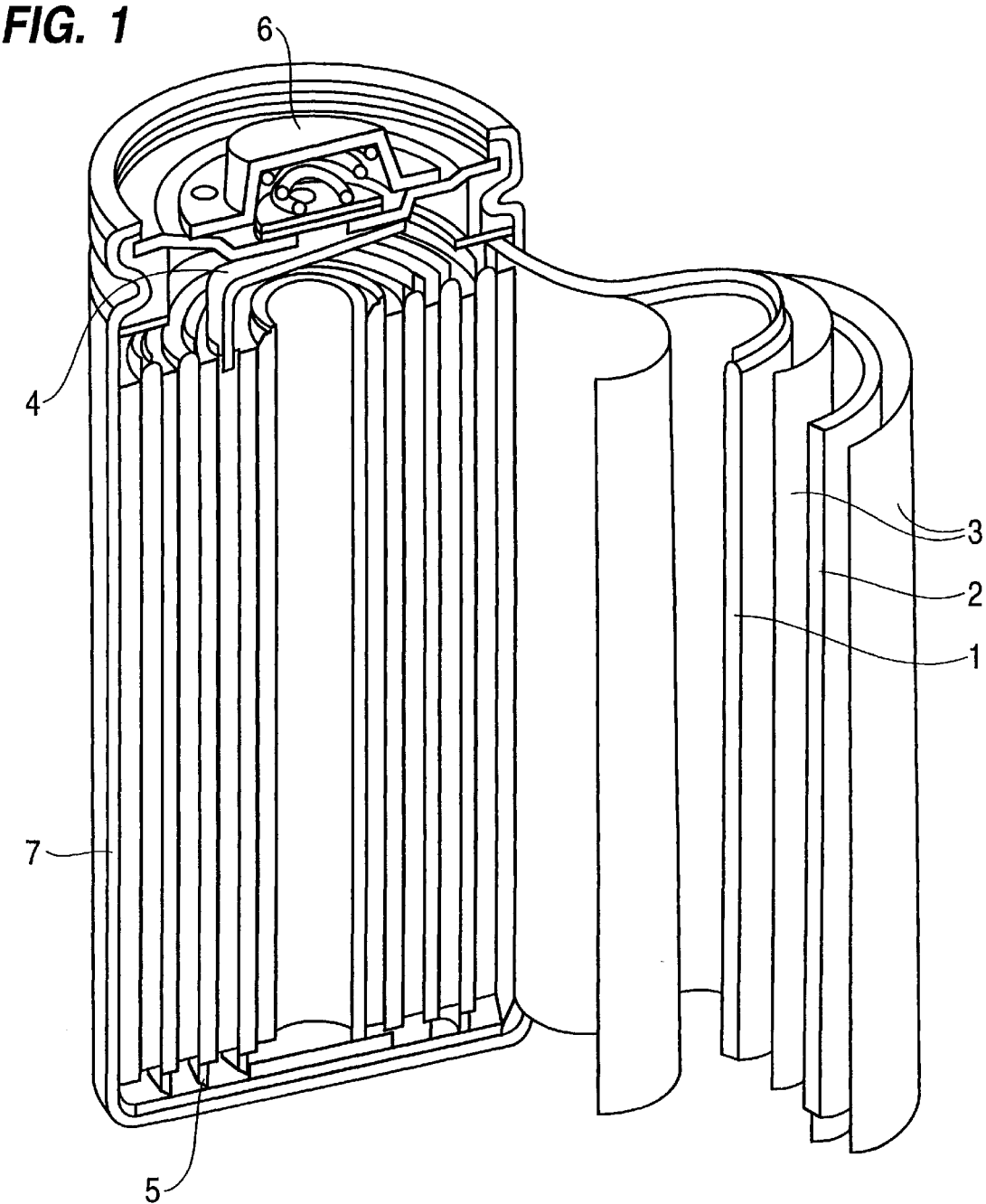
FIG. 1 shows a cross section of the non-aqueous electrolyte secondary cell of the present invention.

FIG. 1 shows a cross section of the non-aqueous electrolyte secondary cell of the present invention. The cell is composed of a positive electrode 1 containing $LiCoO_2$, a negative electrode 2 containing graphite, a separator 3 disposed between these electrodes, a positive electrode lead 4, a negative electrode lead 5, a positive electrode external terminal 6, a negative electrode can 7, and other elements. The positive and negative electrodes 1 and 2 are coiled with the separator 3 filled with an electrolyte and inserted into the negative electrode can 7. The positive electrode 1 is connected with the positive electrode external terminal 6 via the positive electrode lead 4, whereas the negative electrode 2 is connected with the negative electrode can 7 via the negative electrode lead 5, so that the chemical energy which is generated inside the cell is drawn out as electric energy. The electrolyte used for the separator 3 consists of a mixture of ethylene carbonate and diethyl carbonate as a solvent, and 1 mol/liter of $LiPF_6$ dissolved as a solute.

The separator 3 consists of laminated three blend polymer fine porous films each containing PE and PP. The films at both ends have a higher proportion of PP than the film in the middle. To be more specific, the films at both ends have PP and PE in a ratio of 80:20, whereas the film in the middle has PP and PE in a ratio of 20:80. The separator has a thickness of 25 μm.

The separator 3 was produced by disposing the film with a low percentage of PP between the films with a high percentage of PP, and heating them at a temperature lower than the melting points of these blend polymer fine porous films.

The cell with this construction is hereinafter referred to as Cell A of the present invention.

Comparative Example 1

The cell of this example has the same construction as Cell A except that the separator whose thickness is 25 μm consists of a single fine porous film containing PE.

The cell with this construction is hereinafter referred to as Cell X1.

Comparative Example 2

The cell of this example has the same construction as Cell A except that the separator whose thickness is 25 μm consists of a single fine porous film containing PP.

The cell with this construction is hereinafter referred to as Cell X2.

Comparative Example 3

The cell of this example has the same construction as Cell A except that the separator whose thickness of 25 μm consists of a single blend polymer porous film containing PE and PP in a ratio of 20:80.

The cell with this construction is hereinafter referred to as Cell X3.

Comparative Example 4

The cell of this example has the same construction as Cell A except that the separator whose thickness of 25 μm is a single blend polymer fine porous film containing PE and PP in a ratio of 80:20.

The cell with this construction is hereinafter referred to as Cell X4.

Experiment 1

Cell A of the present invention and Cells X1–X4 of Comparative Examples 1–4 were externally short-circuited, and the presence or absence of smoke and ignition were checked. The results are shown in Table 1. In Table 1, the symbol ○ indicates the absence of smoke or ignition whereas the symbol X indicates the presence of smoke or ignition. These symbols are used in the same manner in Tables 3–5, too. The piercing strengths of these cells were also examined, and the results are shown in Table 1. The piercing strength refers to the strength of the separator when a nail with a diameter of 1 mm pierces the separator.

TABLE 1

| cells | separators | piercing strength | shut-down characteristic |
|---|---|---|---|
| A1 | three blend polymer fine porous film (the films at both ends with 80% of PP and the film in the middle with 20% of PP) | 570 g | ○ |
| X1 | a single PE film | 300 g | ○ |
| X2 | a single PP film | 600 g | X |
| X3 | a single blend polymer fine porous film with 80% of PP | 580 g | X |

TABLE 1-continued

| cells | separators | piercing strength | shut-down characteristic |
|---|---|---|---|
| X4 | a single blend polymer fine porous film with 20% of PP | 350 g | ○ |

The results shown in Table 1 indicate that Cell A of the present invention and Cells X1 and X4 of Comparative Examples 1 and 4 did not cause smoke or ignition whereas Cells X2 and X3 of Comparative Examples 2 and 3 had smoke or ignition.

The reason for this seems to be as follows. In Cell A of the present invention, the film in the middle having a high percentage of PE completely melts down at about 130° C. In Cells X1 and X4 of Comparative Examples 1 and 4, the separators completely melt down at about 130° C., so that no current runs in these cells and the cell temperatures do not go higher than 130° C. In contrast, in Cells X2 and X3 of Comparative Examples, the separators do not completely melt down at 130° C. and the current keeps running, so that the cell temperatures exceed 180° C., which leads the cells to the over-reaction mode.

As for the piercing strength, Cell A of the present invention and Cells X2 and X3 of Comparative Examples 2 and 3 have large piercing strengths whereas Cells X1 and X4 of Comparative Examples 1 and 4 have small piercing strengths.

The reason for these results is believed to be as follows. In Cell A, the blend polymer fine porous films at both ends have a higher percentage of PP whose piercing strength is large. In Cell X2, the separator consists of a single film containing PP, but no PE. In Cell X3, the separator consists of a single film having a higher percentage of PP. In contrast, in Cell X1, the separator consists of a single film containing PE, but no PP. In Cell X4, the separator consists of a single film having a higher percentage of PE whose piercing strength is small.

Thus, the separators of Cells X1–X4 of Comparative Examples have defects in either a piercing strength or a shut-down characteristic whereas the separator of Cell A of the present invention has a sufficient piercing strength and a high shut-down characteristic.

Experiment 2

The piercing strengths of separators composed of blend polymer fine porous films were measured by varying the ratio of PE and PP. The results are shown in Table 2. The measurement was conducted in the same manner as in Experiment 1. The separators each consists of a single film whose thickness is 25 μm.

TABLE 2

| the ratio of PP (%) | 0 | 10 | 20 | 40 | 60 | 80 | 90 | 100 |
|---|---|---|---|---|---|---|---|---|
| piercing strength (g) | 300 | 320 | 350 | 400 | 500 | 580 | 590 | 600 |

The results shown in Table 2 indicate that the piercing strength becomes larger as the ratio of PP increases. Since the short circuit inside the cell can be satisfactorily suppressed when the piercing strength is about 500 g or larger, the preferable ratio of PP is 60% or higher. Since the short circuit inside the cell can be almost perfectly prevented when the piercing strength is about 550 g or larger, the most preferable ratio of PP is 80% or higher.

Experiment 3

The presence or absence of smoke or ignition when these cells were externally short-circuited were checked by varying the ratio of PE and PP in the blend polymer fine porous films which compose the separators. The results are shown in Table 3. The separators each consists of a single film whose thickness is 25 μm.

TABLE 3

| the ratio of PP (%) | 5 | 10 | 20 | 30 | 40 | 50 | 80 |
|---|---|---|---|---|---|---|---|
| shut-down characteristic | ○ | ○ | ○ | X | X | X | X |

The results shown in Table 3 indicate that smoke or ignition is caused when the ratio of PP is 30% or higher. The reason for this is believed to be as follows. As shown in the graph of FIG. 2 where a blend polymer fine porous film has 80% of PP, a separator having a high percentage of PP does not completely melt down at 130° C. and the current keeps running, so that the cell temperature rapidly rises to 180° C. or higher.

On the other hand, when the ratio of PP is 20% or lower, no smoke or ignition is caused. The reason for this seems to be as follows. As shown in the graph of FIG. 3 where a blend polymer fine porous film has 20% of PP, a separator having a low percentage of PP completely melts down at 130° C. and no more current runs, so that the cell temperature gradually decreases.

Experiment 4

The piercing strengths of separators composed of three blend polymer fine porous films were measured. In addition, the presence or absence of smoke or ignition were checked by externally short-circuiting the cells which employed these separators. The results are shown in Table 4.

In this experiment, the ratio of PP in the films in the middle was fixed at 20% and the ratio of PP in the films at both ends was varied. The measurement of the piercing strength was conducted in the same manner as in Experiment 1. These separators have a thickness of 25 μm.

TABLE 4

| the ratio of PP in the films at both ends | 90 | 80 | 70 | 60 | 50 | 40 | 30 |
|---|---|---|---|---|---|---|---|
| the ratio of PP in films in the middle | 20 | 20 | 20 | 20 | 20 | 20 | 20 |
| piercing strength (g) | 580 | 570 | 540 | 490 | 430 | 390 | 320 |
| perfect defective in slight short circuit | 0.001 | 0.002 | 0.005 | 0.020 | 0.050 | 0.080 | 0.100 |
| shut-down characteristic | ○ | ○ | ○ | ○ | ○ | ○ | |

The results shown in Table 4 indicate that no smoke or ignition was observed in these cells because the films in the middle had a low ratio of PP.

On the other hand, when the films at both ends had 50% or lower ratio of PP, the piercing strength was small, so that the cells were short-circuited and the perfect defective grew. In contrast, when the films at both ends had 60% or higher ratio of PP, the piercing strength nearly reached 500 g, so that short circuit inside was reduced and the perfect defective was lowered. The perfect defective became extremely low when the ratio of PP was 80% or higher.

Experiment 5

The piercing strengths of separators composed of three blend polymer fine porous films were measured. In addition, the presence or absence of smoke or ignition was checked by externally short-circuiting the cells which employed these separators. The results are shown in Table 5.

In this experiment, the ratio of PP in the films at both ends was fixed at 80% and the ratio of PP in the films in the middle was varied. The measurement of the piercing strength was conducted in the same manner as in Experiment 1. These separators have a thickness of 25 μm.

TABLE 5

| the ratio of PP in the films at both ends | 80 | 80 | 80 | 80 | 80 | 80 | 80 |
|---|---|---|---|---|---|---|---|
| the ratio of PP in the films in the middle | 10 | 20 | 30 | 40 | 50 | 60 | 70 |
| piercing strength (g) | 570 | 570 | 570 | 570 | 570 | 580 | 580 |
| shut-down characteristic | ○ | ○ | X | X | X | X | X |

The results shown in Table 5 indicate that in these separators, the piercing strengths are 570 g or larger because the films at both ends have a high ratio of PP.

When the films in the middle have 30% or higher ratio of PP, the separators do not completely melt down at 130° C., so that the current keeps running while the cell temperatures rise. Consequently, the cell temperatures rapidly grow and the cells start to smoke or ignite. On the other hand, when the films in the middle have 20% or lower ratio of PP, the separators completely melt down at 130° C. to prevent the current supply, so that the cells do not smoke or ignite.

Thus, it is preferable for the films in the middle to have 20% or lower ratio of PP.

Others (1) The number of blend polymer fine porous films is not limited to three; it can be two, four, or more.

(2) The arrangement of the blend polymer fine porous films is not limited to disposing one film having a low ratio of PP between two films having a high ratio of PP; a film having a high ratio of PP may be disposed between two films having a low ratio of PP. However, the former arrangement has an advantage that the two outside films having excellent heat resistance makes it possible to maintain the form of the separator even when the film in the middle melts down.

(3) The positive electrode material is not limited to $LiCoO_2$; it can be $LiNiO_2$, $LiMnO_2$, $LiMn_2O_4$, $LiFeO_2$, or the like.

(4) The negative electrode material is not limited to graphite; it can be lithium, an alloy which can absorb and desorb lithium ions, carbon material which can absorb and desorb lithium ions, or the like.

(5) The solvent of the electrolyte is not limited to a mixture of ethylene carbonate and diethyl carbonate; it can be a single organic solvent such as ethylene carbonate, vinylene carbonate, or propylene carbonate, or a mixture of at least one of these organic solvents and a low-boiling-point solvent such as dimethyl carbonate, diethyl carbonate, 1,2-dimethoxyethane, 1,2-diethoxyethane, and ethoxymethoxyethane.

(6) The solute of the electrolyte is not limited to $LiPF_6$; it can be $LiClO_4$, $LiCF_3SO_3$, or the like.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A non-aqueous electrolyte secondary cell comprising:
   a positive electrode containing lithium-contained complex oxide;
   a negative electrode containing a material which absorbs and desorbs either lithium or lithium ion; and
   a separator which is filled with an organic electrolyte, wherein said separator is composed of a plurality of laminated blend polymer fine porous films each containing polyethylene and polypropylene, and at least one of said laminated blend polymer fine porous films has 20% or lower ratio of polypropylene.

2. The non-aqueous electrolyte secondary cell of claim 1, wherein at least one of said blend polymer fine porous films other than said blend polymer fine porous film having 20% or lower ratio of polypropylene has 60% or higher ratio of polypropylene.

3. The non-aqueous electrolyte secondary cell of claim 2, wherein at least one of said blend polymer fine porous films other than said blend polymer find porous film having 20% or lower ratio of polypropylene has 80% or higher ratio of polypropylene.

4. The non-aqueous electrolyte secondary cell of claim 1, wherein said plurality of laminated blend polymer fine porous films consists of three laminated blend polymer fine porous films, and the blend polymer fine porous film in the middle has 20% or lower ratio of polypropylene while two other blend polymer fine porous films have 60% or higher ratio of polypropylene.

5. The non-aqueous electrolyte secondary cell of claim 4, wherein said plurality of laminated blend polymer fine porous films consists of three laminated blend polymer fine porous films, and the blend polymer fine porous film in the middle has 20% or lower ratio of polypropylene while two other blend polymer fine porous films have 80% or higher ratio of polypropylene.

6. The non-aqueous electrolyte secondary cell of claim 5, wherein said separator has a thickness of 20 to 35 µm.

7. The non-aqueous electrolyte secondary cell of claim 6, wherein material of said positive electrode is selected from a group consisting of $LiCoO_2$, $LiNiO_2$, $LiMnO_2$, $LiMn_2O_4$, and $LiFeO_2$.

8. The non-aqueous electrolyte secondary cell of claim 7, wherein a solvent of said organic electrolyte is at least one organic solvent which is selected from a group consisting of ethylene carbonate, vinylene carbonate, and propylene carbonate, or a mixture of said at least one organic solvent and at least one of low boiling point solvent which is selected from a group consisting of dimethyl carbonate, diethyl carbonate, 1,2-dimethoxyehane, 1,2-diethoxyethane, and ethoxymethoxyethane.

\* \* \* \* \*